United States Patent [19]

Morita et al.

[11] Patent Number: 4,894,158

[45] Date of Patent: Jan. 16, 1990

[54] POROUS FILTER ELEMENT WITH UNDULATIONS

[75] Inventors: Tadashi Morita, Gamagori; Kazuhiro Nomura, Sayama; Yoshiyuki Matsushima, Tokyo, all of Japan

[73] Assignee: Kirin Beer Kabushiki Kaisha, Tokyo, Japan

[21] Appl. No.: 80,304

[22] Filed: Jul. 31, 1987

[30] Foreign Application Priority Data

Sep. 11, 1986 [JP] Japan ................................ 61-214526

[51] Int. Cl.$^4$ ............................................. B01D 27/04
[52] U.S. Cl. .................... 210/497.2; 210/498; 210/510.1; 419/23; 55/523; 75/93 R; 29/163.8
[58] Field of Search ................. 29/163.5 R, 163.5 F, 29/469, 527.5, 557, 33 D, 163.6, 163.8; 210/497.01, 497.2, 498, 510.1; 419/2, 5, 23; 55/523; 75/93 R

[56] References Cited

U.S. PATENT DOCUMENTS

| | | | |
|---|---|---|---|
| 2,206,395 | 4/1940 | Gertler | 210/510.1 |
| 2,436,602 | 2/1948 | Rickmeyer | 210/510.1 |
| 2,928,733 | 3/1960 | Wagner | 210/510.1 |
| 2,957,235 | 10/1960 | Steinberg | 210/510.1 |
| 3,033,783 | 5/1962 | Lubben | 29/163.5 F |
| 3,524,548 | 8/1970 | McDonald et al. | 210/510.1 |
| 3,594,292 | 7/1971 | Russell et al. | 29/163.5 F |
| 3,788,486 | 1/1974 | Bergstrom | 55/523 |
| 3,911,547 | 10/1975 | Vinz | 29/163.5 F |
| 3,933,652 | 1/1976 | Weichselliaun et al. | 210/510.1 |
| 3,980,445 | 9/1976 | Aleshir et al. | 210/510.1 |
| 4,072,616 | 2/1978 | Rohlig | 210/510.1 |
| 4,186,100 | 1/1980 | Matt | 210/510.1 |
| 4,287,068 | 9/1981 | Bewley | 55/523 |
| 4,765,833 | 8/1988 | Naruniya et al. | 210/510.1 |

FOREIGN PATENT DOCUMENTS

58-181805 4/1982 Japan.
597762 10/1982 Japan.

Primary Examiner—Richard V. Fisher
Assistant Examiner—Wanda L. Millard
Attorney, Agent, or Firm—Ladas & Parry

[57] ABSTRACT

A porous filter element for filtering a liquid, the filter element having a plurality of seamless filter element units that are made of stainless steel or titanium powder wherein ranges of particle diameters, sintering densities, and nominal pore sizes define a final shape which is formed with undulations to provide bed surfaces for an auxiliary filtering agent.

8 Claims, 3 Drawing Sheets

POROUS FILTER ELEMENT WITH UNDULATIONS

BACKGROUND OF THE INVENTION

The present invention relates to a filter element which is precoated with kieselguhr or the like auxiliary filtering agent and highly adapted for execution of filtration of beer or the like liquid.

In the conventional production step of beer, Japanese sake and the like, such filtering apparatuses as using kieselguhr and the like auxiliary filtration agent for execution of clarifying filtration are broadly employed.

As for the filter elements serving for this purpose, the filter element per se is porous and thus serving for filtering function, and in addition, the outer surface thereof acts as mounting means for the precoated kieselguhr or the like auxiliary filtering agent, thus providing a combined filtering function together with the auxiliary filtration agent.

As such kind of porous filter element, porous cylindrical ceramic filters were disclosed as an example in Japanese Patent Publication No. 18986/1984.

These known porous cylindrical ceramic filters which act as mounting means for a precoat layer of kieselguhr or the like auxiliary filtering agent are superior in such a point as having a higher rigidity of the filter element per se in comparison with conventional wire mesh mode filter elements, thereby minimizing disadvantageous deformation and vibration otherwise caused by fluctuation in pressure and liquid flow rate frequently appearing in and through the filter vessel. More specifically, when the filter elements are used in beer-manufacturing plants, even if fluid pressure and flow rate fluctuations of the above-mentioned nature frequently occur, thus inviting disadvantageous crackings in the precoating layers, beer yiest and impurities are not apt to leak therethrough into the purified beer.

However, it should be noted that the conventionally used porous cylindrical ceramic filter of the above kind has generally a rather thick wall, amounting to 20~30 mm, and especially by virtue of the porous structure, and thus, when a reverse flow cleaning step is applied, in advance of applying a precoating of auxiliary filtering agent, it is highly difficult to remove residual kieselguhr and organic impurities clogged in the fine pores, thereby liably inviting clogging of the filtering pores. For avoiding such stop-pore phenomenon, at least once a year a regenerating treatment must be carried out disadvantageously.

Since the conventional filter elements are made of ceramic material, and thus, the hardness shows a higher value, but the material is naturally brittle so that mechanical damages such as surface cracking and breakage may frequently occur during operator's ill-treatment and/or collision against other hard substance, which means naturally a grave problem to be solved out.

As is commonly known, in the case of ceramic filters, it is highly difficult to produce a large length one. Thus, it is the conventional technique to fusingly joint certain commonly available length ceramic tubes one after another or to introduce gasket means between a pair of neighboring short length ceramic tubes and then the total elongated assembly is mechanically fixed longitudinally and under pressure by means of a fixture or the like, for attaining a desirously elongated tubing. In the case of the elongated filter element manufactured with use of fusingly jointing agent, it is observed that the latter is liably subjected to corrosion by contact with alkaline cleaning solution as commonly used in the beer manufacturing line for sterilizingly cleaning purpose. For avoiding such trouble as set forth above, it was necessary to use chlorine-containing cleaner solution for execution of a separate line cleaning job on the beer manufacturing line including the ceramic-made filter element(s) and independent of conventionally employed line cleaning job. On the other hand, in the case of the mechanically conjoined filter element above set forth, the structure thereof is rather complicated and the manufacturing cost is considerably high.

SUMMARY OF THE INVENTION

It is an object to provide an improved porous filter element providing a superior reverse flow cleaning possibility and of high mechanical strength, in addition to weld-conjointing possibility suitable for providing a highly elongated length porous filter element.

According to one aspect of this invention, there is provided a porous filter element for filtering a liquid with use of an auxiliary filtering agent, which is prepared in such a way that metal powder is extruded into a hollow seamless cylindrical shape, and then subjected to sintering.

According to another aspect of this invention, there is provided a method of manufacturing a porous filter element for filtering a liquid with use of an auxiliary filtering agent, which comprises steps of extruding metal powder into a hollow seamless cylinder and sintering the hollow seamless cylinder.

The nature, utility, and further features of this invention will be more clearly apparent from the following detailed description with respect to preferred embodiments of the invention when read in conjunction with the accompanying drawings briefly described below.

DETAILED DESCRIPTION OF THE INVENTION

Figure 1:
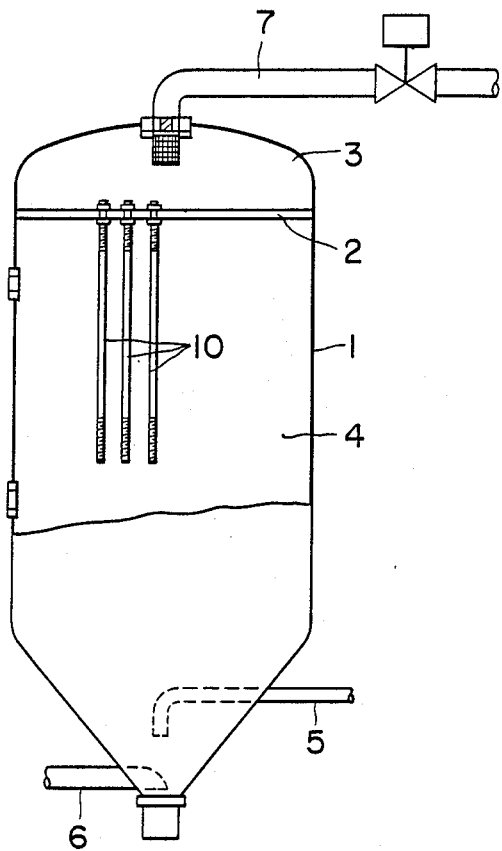
FIG. 1 is a schematic structural view of a filtering apparatus fitted insidely with a number of filter elements constructed according to the inventive principle.

FIG. 1 represents a schematic representation of a filter tank provided insidely with a plurality of the filter elements. In this drawing, numeral 1 represents the filter tank, the interior space of which is divided tightly by provision of a tube plate 2 into two, or more specifically an upper filter chamber 3 and a lower mother liquid chamber 4. Filter tank 1 is fitted at its bottom portion with a mother liquid (for instance, raw beer) introducing pipe 5 and a sludge discharge pipe 6, while, at the top end of the tank, a filtrate discharge pipe 7 is arranged.

From the tube plate 2, a number of filter elements 10 are suspended (however, in FIG. 1 only a part thereof being illustrated).

Figure 2:
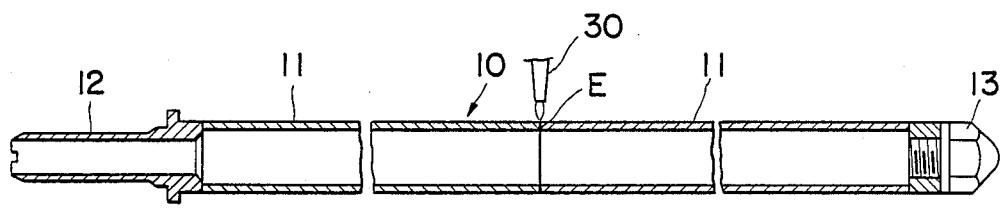
FIG. 2 is a sectional view of a filter element according to the invention.
Figure 3:
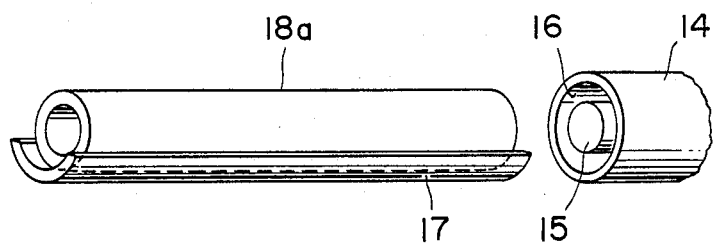
FIG. 3 is a perspective view of a rough-shaped single tube for illustration of the extrusion step thereof.

Next, referring to FIGS. 2 and 3, the filter element 10 will be illustrated more specifically.

The filter element 10 is composed of a plurality of (two in FIG. 2) elongated hollow tubular filter element units 11 longitudinally welded one after another (as an example, by TIG-welding technique using an argon-hydrogen mixture). To the uppermost filter element unit 11, a mouth piece 12 is tightly fitted in, while the lowermost filter element unit 11 is attached with a plug 13.

Each filter element unit 11 is made of a sintered metal, as the main material thereof being used in the present embodiment stainless steel (SUS) or titanium. More specifically, the unit 11 is made in such a way that, as an example, granules of stainless steel is mixed with a resin, kneaded together, extruded and sintered into a rough-shaped intermedite product, which is then subjected to a swaging step with use of split mold elements subjected to lateral and repeated blows from outside.

Figure 4:
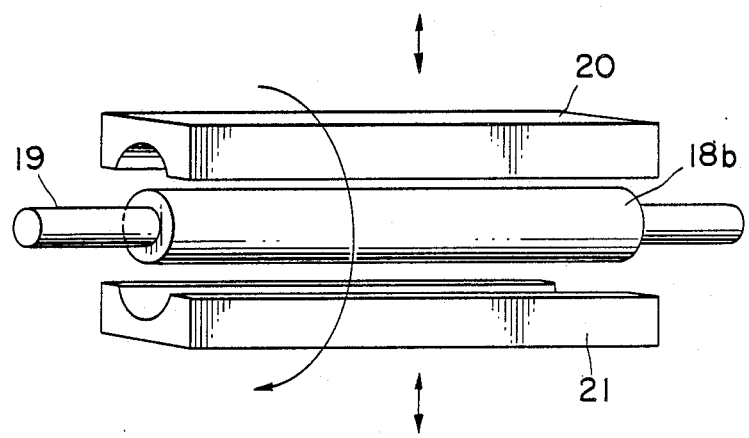
FIG. 4 is a perspective view of a swaging step as being applied on a dried-up tube.

Still more specifically, a metal powder, the particle's diametral sizes having been properly adjusted is admixed with a binder such as preferably methyl cellulose or the like; burnable particle paraffin filler; glycerol propylene glycol or the like lubricant, added with water as solvent, and then the paste mass is kneaded and extruded from a screw extruder having a central core member 15 provided at the tip end portion 14 thereof as shown in FIG. 3. The paste mass is extruded in practice from a hollow cylindrical shaping space 16 formed around core member 15, onto a chute-like receiver 17. In this way, a rough-shaped hollow tube 18a is provided which is then subjected to a heating step at a temperature of 120°~130° C. in a drying furnace for about 3 hours. Next, a mandrel 19 is passed through the core space of the dried-up raw tube 18b and then subjected to a swaging step, as shown in FIG. 4, by means of a pair of split molds 20; 21 which preform a reciprocating motion radially while making a planetary motion around the dried-up raw tube 18b as the center. In this way, the density of the wall of dried-up raw tube 18b is set. Thereafter, the raw tube is sintered in vacuum at about 1300° for 1 hours in a sintering furnace. Then, the tube is reswaged at least once, worked for size correction and reheated for resintering to provide a unit tube.

In this way, however, a desirously elongated tubing cannot be obtained, because the thus realized tube length is less than 1 m. Since the unit tube length must be longer than 2 m, if it is to be utilized in beer filtration job, the neighboring and opposing ends E of two successive units 11 are subjected to TIG-welding by means of an electrode 30 (FIG. 2). Since these units 11 are made of a sintered metal, the required welding is possible and the required lengthy tubing can be easily manufactured. In this respect, in the case of ceramic filters, such welding cannot be adopted, thus a lengthy tubing could not be provided.

The thus produced filter element unit 11 has a thin wall thickness (3 mm or so) in the present embodiment and the wall represents a large number of inside fine pores, thus showing a densely porous structure. The pore diameter amounts to 20~25 microns.

Figure 5:
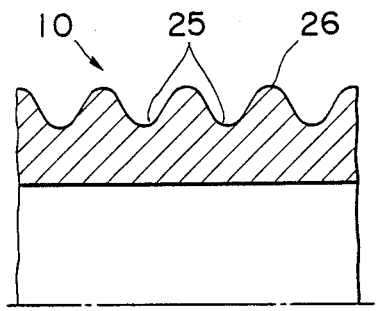
FIG. 5 is an enlarged sectional view of a part of the filter element.

On the other hand, the outer surface of filter element unit 11 is smooth after the shaping process at the swaging step. Even with such smooth outer surface, and upon execution of the kieselguhr coating, a filtration job could be carried out. However, in the present invention, undulations are preferably provided on such smooth outer surface, for providing rather more effective depositing surface for the auxiliary filtering agent, so as to prevent otherwise possible slip drop thereof. More specifically, as shown in FIG. 5 representing an enlarged sectional view, a spiral groove 25 is formed on the outer surface of filter element 10 for providing undulations thereon, to form better depositing bed surfaces 26 for the auxiliary filtering agent.

Figure 6:
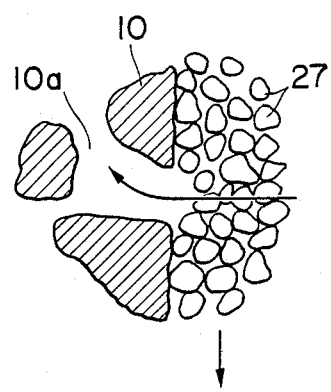
FIGS. 6 and 7 are schematic and explanatory views illustrating the function of the filter element.
Figure 7:
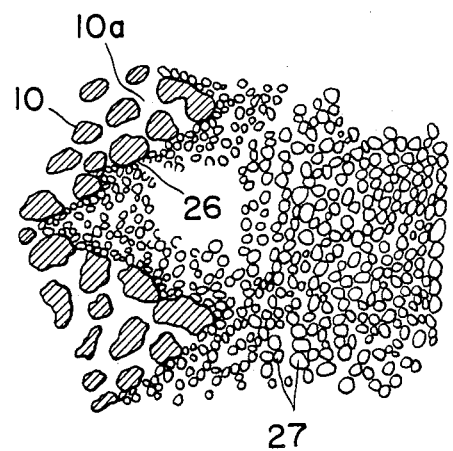

Merits and effects by forming such undulations on the outer surface of the element will be set forth hereinunder with reference to FIGS. 6 and 7.

First, referring to FIG. 6, the effect with use of a smooth surface before providing undulations as better depositing beds for the auxiliary filtering agent. With accumulation of kieselguhr on the outer surface of filter element 10, kieselguhr 27 bridges over each pore 10a of the element when seeing microscopically. However, by virtue of weak supporting force provided by the smooth surface of the filter element 10, the accumulated layers of kieselguhr 27 are liable to slip down under gravity action therefrom. Or more specifically, when there is a liquid flow in use, the kieselguhr layers will be held in position in some or other way. If there is no fluid flow, kieselguhr layers will be subjected to a downward slip-off action. Further, even in the presence of slightest fluctuation in liquid flow and/or pressure, the bridges may be broken and separated kieselguhr will leak to the secondary side of the filter. Or otherwise, crackings may occur in the accumulated layers of kieselguhr, which are thus highly unstable.

On the contrary, when the smooth outer surface of the filter element is provided with undulations to form bedding seats 26 for optimum deposition of the auxiliary filtering agent, the seats 26 hold firmly the kieselguhr 27, as shown in FIG. 7, thereby buffering otherwise occurring slip-off force urging to separate the kieselguhr from the element 10 and intensifying the holding performance. In the foregoing description of the present embodiment, a spiral or screw thread groove was formed after execution of the sintering step, as a preferrence for the formation of bedding seats, on the outside peripheral surface of the filter element. However, formation of the bedding seats is not limited only thereto. Or instead, a surface roughening working may be adopted for the same purpose, after execution of the sintering step. As a further modification, formation of the undulations for providing optimal seating areas may be carried out even in advance of the shaping and sintering steps.

Next, a preferred embodiment will be set forth based upon our practical experiments.

Use is made of paste mixtures comprising powders of stainless steel, SUS 316L, particle sizes thereof being 0.100~0.160 mm; 0.160~0.300 mm; 0.300~0.355 mm, respectively, each 5 kg of respective steel powders, being added with binder: methyl cellulose 150 g; binding filler: granular paraffin 75 g; lubricant: glycerin 180 cc; and water as solvent for the binder: 1000 cc, respectively. Each of these paste mixtures is extruded from a screw extruder at an extrusion and shaping pressure of 120 kg/cm$^2$ to provide a seamless hollow cylindrical product, O.D.: 30 mm; wall thickness: 3 mm; and length: 1000 mm (according to the extrusion and shaping process as embodied in the present embodiment, similar semiproducts of wall thickness 2~6 mm; length-/diameter: higher than 5, may be easily shaped when desired), then the semiproduct is dried up with heated air streams, heated for removal of paraffin and sintered in vacuum (at 1300° C.×1 hr) and then subjected to a correction step by swaging or with use of pressure roller means and the like, to provide test pieces Nos. 1~5, in the form of porous filter elements. Respective sintering densities and degrees of filtration as specified in Japanese Industrial Standard (JIS) B8371, as measured are given in the following Table 1.

TABLE 1

| No. of experiment | Metal particle diameter (mm) | Sintering density (g/cc) | Pore ratio (%) | Nominal filtration degree (μ) | Remarks |
|---|---|---|---|---|---|
| 1 | 0.100 | 3.4 | 50 | 10 | inferior in strength |
|  | ~ | ~ | ~ |  |  |
|  | 0.160 | 3.8 | 53 |  |  |
| 2 | 0.100 | 4.0 | 40 | 10 | flow resistance, somewhat high |
|  | ~ | ~ | ~ |  |  |
|  | 0.160 | 4.8 | 50 |  |  |
| 3 | 0.160 | 4.0 | 40 | 20 | optimum |
|  | ~ | ~ | ~ |  |  |
|  | 0.300 | 4.8 | 48 |  |  |
| 4 | 0.300 | 4.0 | 40 | 40 | auxiliary filtering agent is to be used |
|  | ~ | ~ | ~ |  |  |
|  | 0.355 | 4.8 | 48 |  |  |
| 5 | 0.300 | 5.2 | 28 | 40 | flow resistance, somewhat high |
|  | ~ | ~ | ~ |  |  |
|  | 0.355 | 5.8 | 36 |  |  |

In accordance with the data enlisted in the foregoing Table 1, the porous filter element No. 1 having metal particle diameter of 0.100~0.160 mm; sintering density of 3.4~3.8 g/cc, shows lesser mechanical strength, thus being unsuitable for practical use. The porous filter element No. 4, having metal particle diameter of 0.300~0.355 mm; sintering density of 4.0~4.8 g/cc, shows least flow-out of auxiliary agent, yet enough usable with specific selection and use of cellulose and the like auxiliary filtering agent. The porous filter elements Nos. 2 and 5, having metal particle diameter of 0.100~0.160 mm and 0.300~0.355 mm, respectively; sintering density of 4.0~4.8 g/cc and 5.2~5.8 g/cc, respectively, show somewhat increased flow resistance, are yet applicable upon increase of pumping pressure for mother liquid. The test piece No. 3 shows none of these drawbacks, thus being usable optimumly.

In the following Table 2, compared results in characteristics with conventional ceramic filters of similar shape and dimensions are enlisted. In the case of sintered stainless steel-made porous filter element is rather more stable in contact with alkaline solution in comparison with the reference; showing higher mechanical strength and rather superior machinability in cutting, welding and the like. As for pore size uniformity as well as precoating strength, these are superior as those of the reference product. Further, wall thicknesses of the inventive products are made substantially thinner than the reference, thereby the reverse flow washing operation showing extremely favorable results.

TABLE 2

|  | Alkaline stability | Mechanical strength | Machinability | Pore size uniformity | Precoat layer strength | Reverse flow washability |
|---|---|---|---|---|---|---|
| Sintered stainless steel porous filter element | ◎ | ◎ | ◎ | ○ | ◎ | ○ |
| Conventional ceramic filter | X | Δ | Δ | ○ | ◎ | Δ |

Evaluation: ◎ .. Superior, ○.. Better, Δ ... Acceptable, X ... Unacceptable

In the following, several examples with use of titanium powder will be set forth.

Titanium powders, having particle diameters of 0.100~0.160 mm; 0.160~0.300 mm; and 0.300~0.355 mm are used, respectively. In each case, 2.8 kg of titanium powder is added as binder with methyl cellulose 150 g; as binding filler with granular paraffin 75; as lubricant with grycerin 180 cc; and as solvent for binder with water 1000 cc, to form a mixed paste which is then extruded from a screw extruder under extrusion pressure of 120 kg/cm² into seamless hollow cylinders of O.D. 30 mm; wall thickness of 3 mm; and length: 1000 mm. The resulted semiproduct is then dried up in heated air streams and subjected to further heating for removal of paraffin content and sintering in vacuum (at 1300° C.×1 hr) and finally to a swaging or pressure roller shape-correction job. In this way, porous filter elements in form of test pieces Nos. 6~10. Results of measurements on these samples Nos. 6~10 are shown in the following Table 3 in terms of respective sintering densities and degrees of filtration as prescribed in Japanese Industrial Standard (JIS) B8371.

TABLE 3

| No. of experiment | Metal particle diameter (mm) | Sintering density (g/cc) | Pore ratio (%) | Nominal filtration degree (μ) | Remarks |
|---|---|---|---|---|---|
| 6 | 0.100 | 1.7 | 50 | 10 | inferior in strength |
|  | ~ | ~ | ~ |  |  |
|  | 0.160 | 2.0 | 62 |  |  |
| 7 | 0.100 | 2.2 | 40 | 10 | flow resistance, somewhat high |
|  | ~ | ~ | ~ |  |  |
|  | 0.160 | 2.7 | 51 |  |  |
| 8 | 0.160 | 2.2 | 40 | 20 | optimum |
|  | ~ | ~ | ~ |  |  |
|  | 0.300 | 2.7 | 48 |  |  |
| 9 | 0.300 | 2.2 | 40 | 40 | auxiliary filtering agent is to be used |
|  | ~ | ~ | ~ |  |  |
|  | 0.355 | 2.7 | 48 |  |  |
| 10 | 0.300 | 2.9 | 27 | 40 | flow resistance, somewhat high |
|  | ~ | ~ | ~ |  |  |
|  | 0.355 | 3.3 | 36 |  |  |

According to the Table 3, test piece porous filter element No. 6, having metal particle diameter of 0.100~ 0.160 mm; sintering density of 1.7~2.0 g/cc, is unacceptable in practical use, on account of lesser mechanical strength. Test piece No. 9, having metal particle diameter of 0.300~0.355 mm; sintering density of 2.2~2.7 g/cc, represents fear of small flow-out amount of auxiliary agent, as a disadvantageous feature, which can be, however, remedied enough by specific selection and usage of auxiliary filtering agent. As for further test pieces Nos. 7 and 10, having metal particle sizes of 0.100~0.160 and 0.300~0.355, respectively; and sintering densities of 2.2~2.7 and 2.9~3.3 g/cc, respectively, show somewhat increased flow resistances as a disadvantage, which can, however, be remedied enough by increase of mother liquid pumping pressure. As for the remaining test piece No. 8, it shows none of these defects and thus, being optimum.

In the following Table 4, comparative experimental results in physical properties of the inventive filter elements made of titanium with conventional ceramic filters are shown. It will be clearly understood therefrom that the porous filter elements made of sintered titanium are highly stable in contact with alkaline solution in comparison with the conventional reference material, and with higher mechanical strength and superior characteristics in machinability in mechanical cutting, welding and the like. Further, as for pore size uniformity and precoat layer strength, the inventive filter elements represents similar performances with the comparative conventional material. Still further, the reverse flow cleanability is also superior.

TABLE 4

| | Alkaline stability | Mechanical strength | Machinability | Pore size uniformity | Precoat layer strength | Reverse flow washability |
|---|---|---|---|---|---|---|
| Sintered titanium porous filter element | ◎ | ◎ | ◎ | O | ◎ | O |
| Conventional ceramic filter | X | Δ | Δ | O | ◎ | Δ |

Evaluation: ◎.. Superior, O.. Better, Δ... Acceptable, X... Unacceptable

For practical use of such porous filter element 11 of above kind, double precoating may be carried out, if wanted, with use of two kinds of auxiliary filtering agent. As an example, first precoating is executed with kieselguhr of particle sizes: 5~90μ, and a second precoating is made upon the first one and with kieselguhr of particle sizes: 2~40μ.

As for the wall thickness of the porous filter element 11, when the former is selected in the range of 2~6 mm, the latter is effective to represent the necessary characteristics as such and to serve well as the mounting means for the auxiliary filtering agent such as kieselguhr or the like.

It may be well understood from the foregoing, that the inventive porous filter element which is formed of a shapingly extruded and sintered metal, may have enough thinner wall thickness and is capable for easily providing an extremely long, seamless hollow cylindrical and porous filter element which is further highly suitable for execution of the reverse flow washing operation without inviting otherwise frequently occurring pore clogging, in addition to the superior cleaning performance without corrosion and errosion even with use of various aggressive cleaner solutions.

Further, thanks to the metallic structure of the filter element, it represents a higher mechanical strength, thereby providing least possible surface damages during handling thereof, and a better machinability for the formation of undulations in and on the peripheral wall.

What is claimed is:

1. A porous filter element for filtering a liquid, said filter element comprising a plurality of seamless filter element units that are made of stainless steel powder wherein the range of particle diameter of said stainless steel powder is between 0.100–0.355 mm, wherein these particles are sintered into a final shape at a sintering density of 4.0–5.8 g/cc, a pore ratio of 28–50% and a nominal passage pore size of 10–40μ, and wherein an outside surface of said filter element units is formed with minor undulations so as to form bedding surfaces that facilitate the adhesion of an auxiliary filtering agent to the filter element units.

2. The porous filter element of claim 1, wherein said minor undulations are provided by forming a screw thread groove.

3. The porous filter element of claim 1, wherein said filter element has a wall thickness of 2–6 mm and a length/diameter ratio greater than 5.

4. The porous filter element of claim 1, wherein said minor undulations are formed by a surface treatment executed after the seamless filter element units have been sintered.

5. A porous filter element for filtering a liquid, said filter element comprising a plurality of seamless filter element units that are made of titanium powder, wherein the range of particle diameter of said titanium powder is between 0.100–0.355 mm, wherein these particles are sintered into a final shape at a sintering density of 2.2–3.3 g/cc, a pore ratio of 27–51% and a nominal passage pore size of 10–40μ, and wherein an outside surface of said filter element units is formed with minor undulations so as to form bedding surfaces that facilitate the adhesion of an auxiliary filtering agent to the filter element units.

6. The porous filter element of claim 5, wherein said minor undulations are provided by forming a screw thread groove.

7. The porous filter element of claim 5, wherein said filter element has a wall thickness of 2–6 mm and a length/diameter greater than 5.

8. The porous filter element of claim 5, wherein said minor undulations are formed by a surface treatment executed after the seamless filter element units have been sintered.

* * * * *